June 28, 1966   D. H. SCHUSTER   3,258,743
PARA-VISUAL WAVE MOTION INDICATOR
Filed Sept. 5, 1963   9 Sheets-Sheet 1

INVENTOR.
DONALD H. SCHUSTER
BY Moody & Anderson
AGENTS

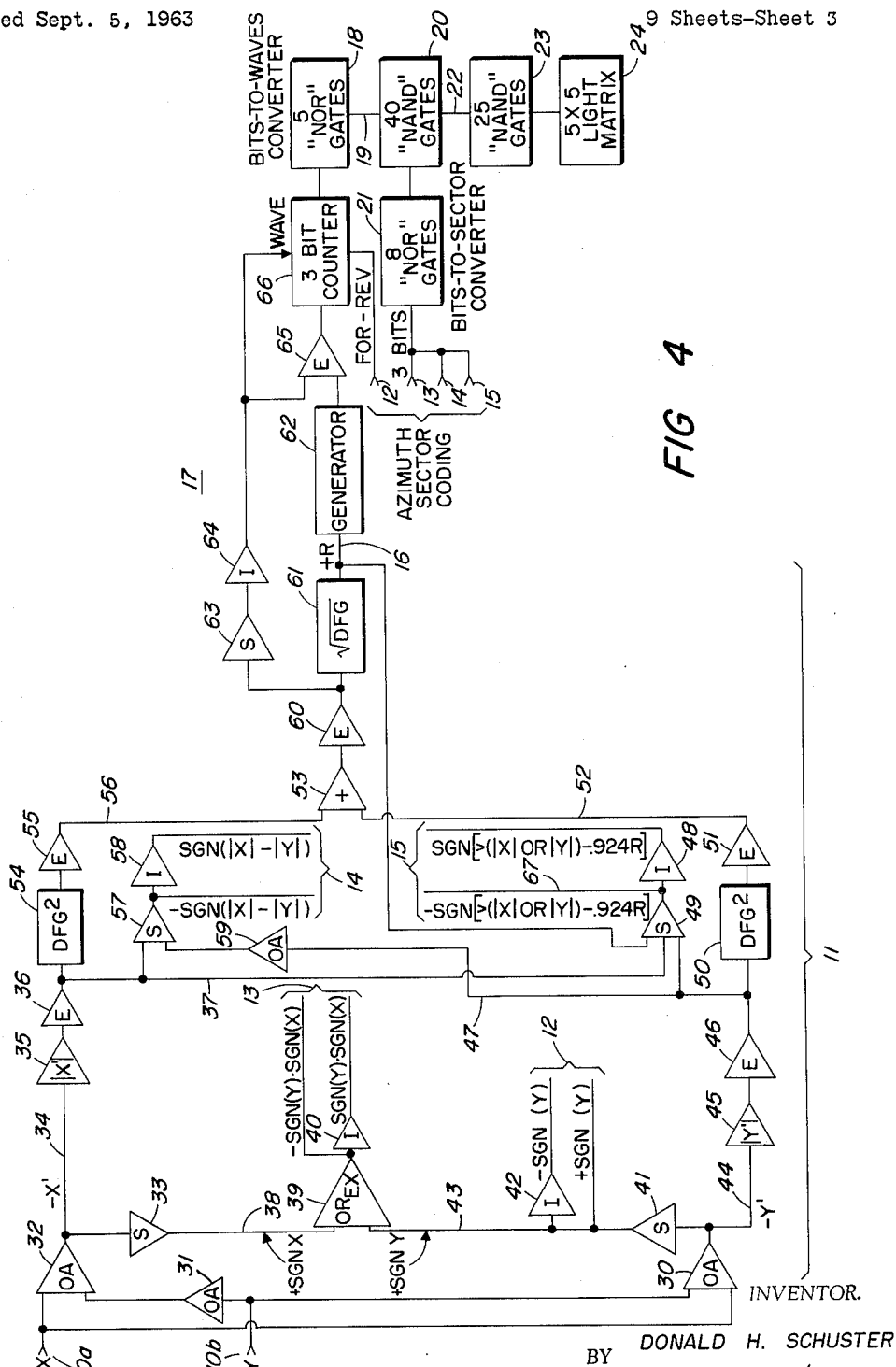

INVENTOR.
DONALD H. SCHUSTER

BY Moody & Anderson
AGENTS

June 28, 1966 D. H. SCHUSTER 3,258,743
PARA-VISUAL WAVE MOTION INDICATOR
Filed Sept. 5, 1963 9 Sheets-Sheet 7

INVENTOR.
DONALD H. SCHUSTER
BY
Moody & Anderson
AGENTS

June 28, 1966  D. H. SCHUSTER  3,258,743
PARA-VISUAL WAVE MOTION INDICATOR
Filed Sept. 5, 1963  9 Sheets-Sheet 8

INVENTOR.
DONALD H. SCHUSTER
BY
Moody & Anderson
AGENTS

1

3,258,743
PARA-VISUAL WAVE MOTION INDICATOR
Donald H. Schuster, Cedar Rapids, Iowa, assignor to Collins Radio Company, Cedar Rapids, Iowa, a corporation of Iowa
Filed Sept. 5, 1963, Ser. No. 306,917
14 Claims. (Cl. 340—27)

This invention relates generally to steering command instrumentation and more particularly to a steering command indicator of a dynamic type wherein the command magnitude is indicated as a rate of motion of an indicating means and the sense of the command is indicated by the direction of motion of the indicating means as viewed by the observer.

Numerous command indicators in current use present commands in the form of the deviation of a moving indicia with respect to a reference wherein the magnitude or extent of the command is interpreted by the extent of deviation of the indicator. These types of indicators may further include means whereby the command indicator remains "zeroed" if the response to the command has been proper to return the craft to the desired attitude or course. In either application such instruments require close and repeated observation on the part of the observer for command interpretation. In aircraft guidance applications, such instrumentation require undesired diversion in critical flight modes such as the approach mode where the pilot's attention must necessarily be divided among a number of other critical instrumentations and during that part of the approach when touchdown is imminent, the pilot is required to make visual contact with the ground.

Because of the above problem, current trends in the aircraft instrumentation are aimed at providing instrumentation which may be viewed peripherally and which may provide command indications which are easily and instantly interpretable without requiring that the pilot fix his eyes upon the command indicator. Such instrumentation enables the pilot to make visual contact with the runway yet still be continuously informed as to critical commands by peripherally viewed indicators. Peripheral indicators convey commands dynamically and may utilize actual motion or simulated motion. One such instrument employing motion as a command and which may then be viewed peripherally is defined in copending application, Serial No. 179,683 now Patent 3,176,265 entitled "Flight Director Display," in which a command configuration resulting from rotating helical patterns is presented to the observer. This type of indicator, while providing dynamic command, requires a mechanical rotation which inherently, for certain applications, may be disadvantageous.

The present invention has as a primary object thereof the provision of a dynamic command indicator which simulates the appearance of motion without any mechanically moving parts. The present invention creates an illusion of motion by controlling the energization of a matrix pattern of lights in a predetermined sequence such that rows or patterns of lights are caused to move at a speed proportional to the intensity of a given command and in a direction corresponding to the sense of the command. The phenomenon utilized in the present invention is like that of a neon sign that produces the appearance of motion to the observer.

The present invention is featured in the provision of a mechanically passive arrangement by which input command signals in the form of the familiar "X–Y" rectangular coordinates are converted to a wave motion in the form of a pattern of lamp indications wherein the speed of the wave motion is proportional to the magnitude of the resultant of the rectangular coordinate input signals and wherein the direction of the wave motion is determined by the angle of the vector defined by the input rectangular coordinate signals.

A further object of the present invention is the provision of a wave motion indicator of the type generally described above wherein provision may be made to add a third dimension of command in the form of lamp colors where said colors may be made to convey throttle command or such other commands as may be deemed appropriate.

These and other objects and features of the present invention will become apparent from reading the following description in conjunction with the accompanying drawings in which;

FIGURE 4 is a further and more detailed functional diagram of the present invention;

Figure 5A:
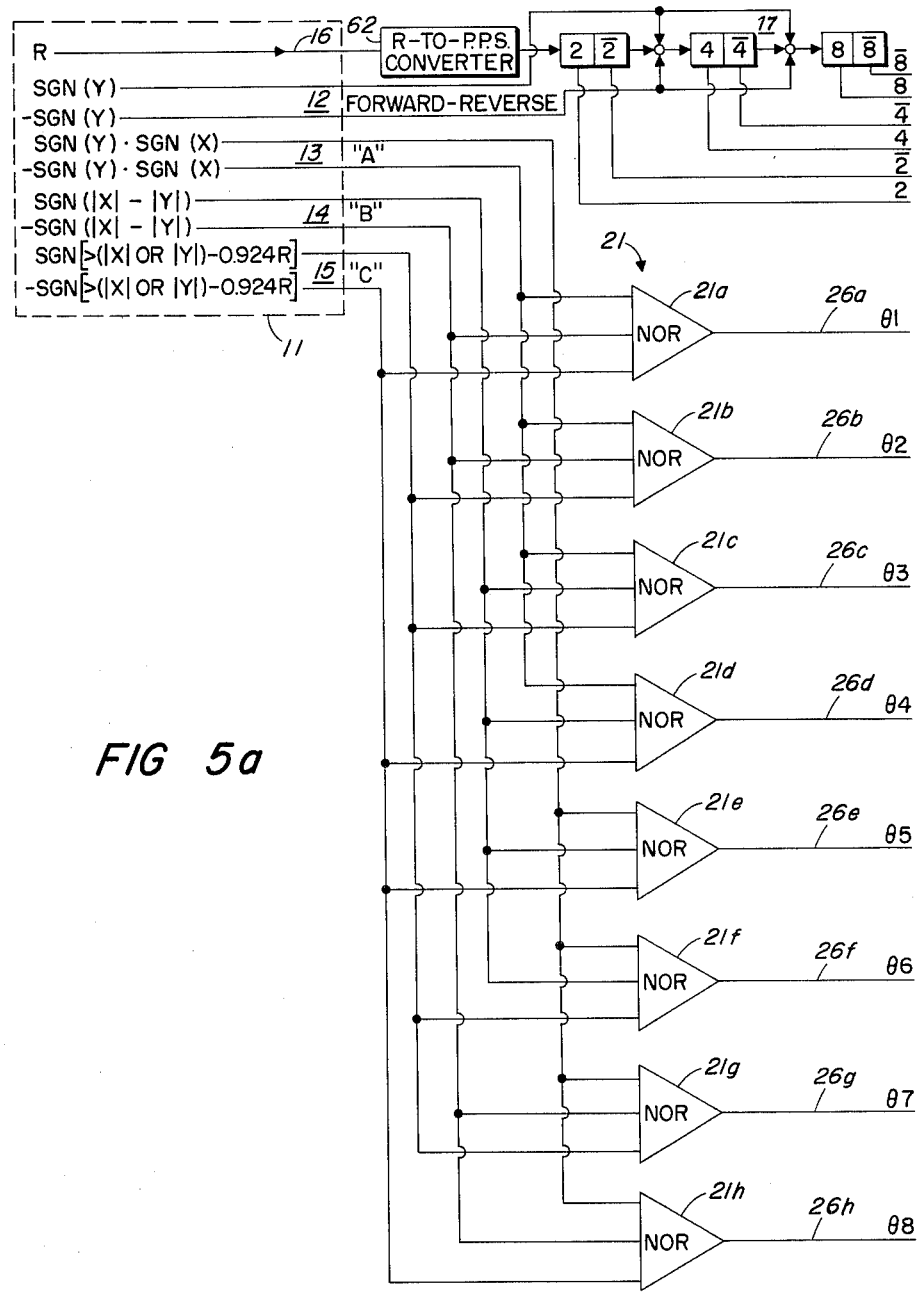
Figure 5B:
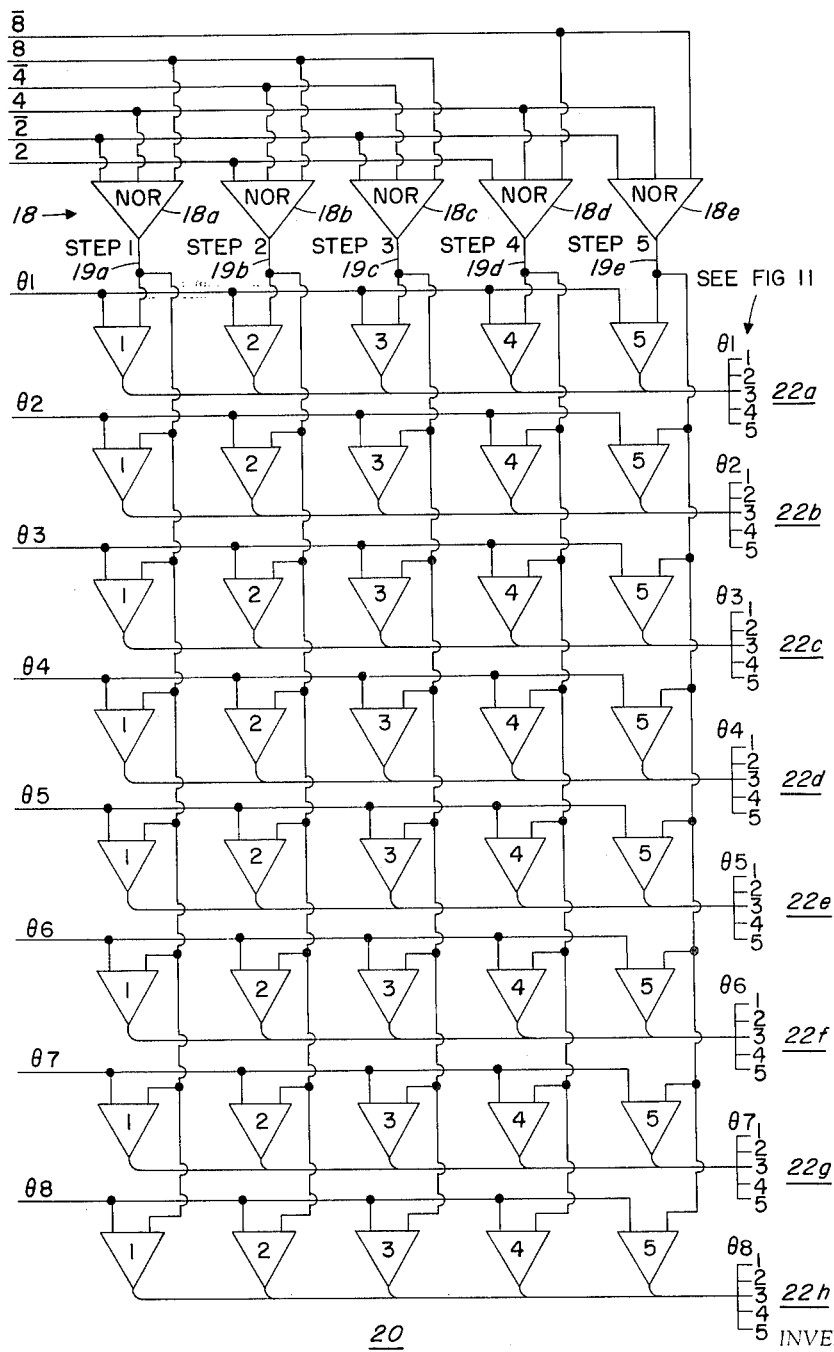
Figure 10:
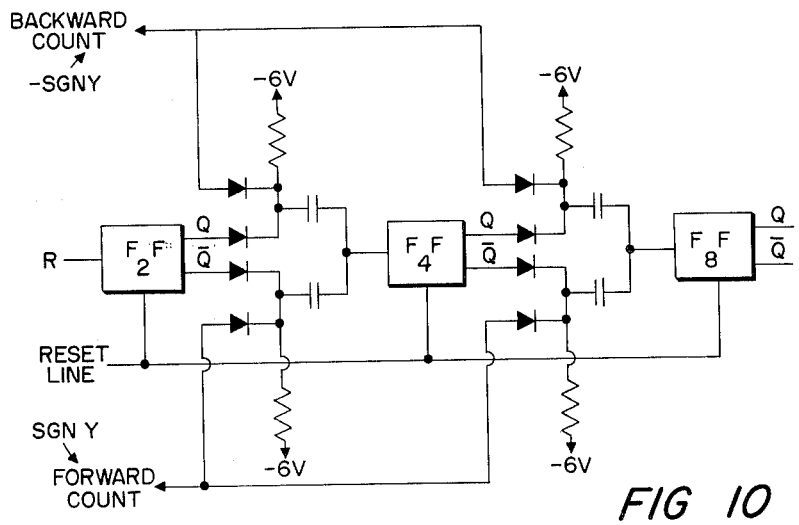
Figure 12:
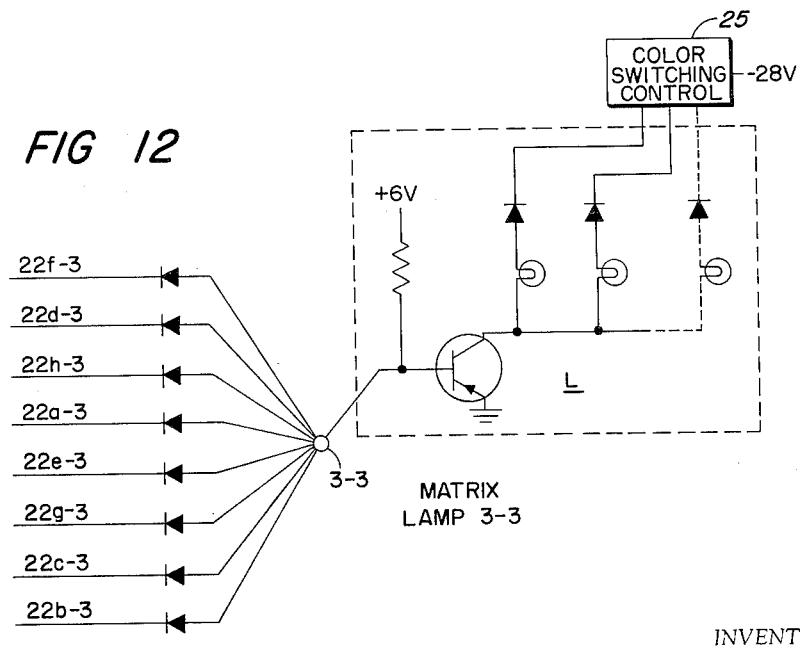
Figure 11:
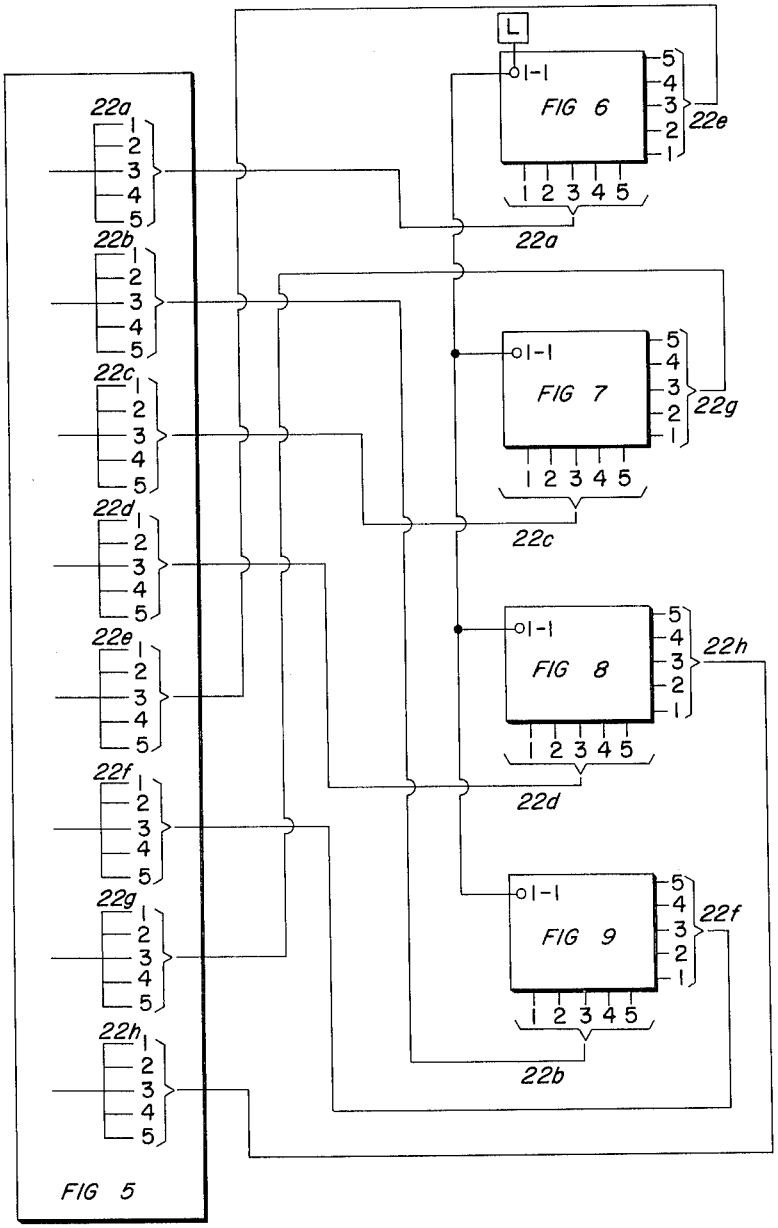

FIGURES 5a and 5b provide a detailed functional diagram of the manner in which azimuthal wave-stepping motion is accomplished in the invention;

FIGURES 6, 7, 8, and 9 are partial schematic diagrams of the indicator lamp matrix of the present invention;

FIGURE 10 is a partial schematic diagram of the forward-reverse binary counter utilized in the present invention;

FIGURE 11 is a diagram showing the interrelationship between control connections as developed in FIGURE 5 as they are wired to the light matrix as represented by FIGURES 6–9; and FIGURE 12 is a schematic diagram of the driving interconnections associated with a matrix lamp driver in accordance with the present invention.

Figure 1A:
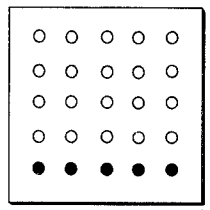
FIGURE 1 illustrates command aspects of the indicator of the present invention.
Figure 1B:
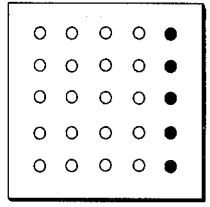

The indicator of the present invention is generally illustrated in FIGURE 1 as being a panel upon which is mounted an array of lamps arranged in five rows and five columns. The concept to be utilized is that of controlling the energization of the lamps in predetermined lines and to "step" these line patterns across the panel to simulate a moving wave. The speed of this wave will be proportional to the intensity of the command to be portrayed. The direction of travel of the wave will indicate the direction of the command, i.e., up-down, left-right, or composite combinations of left and right. FIG. 1a, for example, might indicate a "pitch-up" command by a wave motion starting at the bottom of the indicator and proceeding to the top, then appearing again at the bottom and proceeding to the top, etc. FIG. 1b illustrates a "turn-left" command wherein the wave motion starts at the right of the pattern and proceeds to the left in a repetitive sequence. The observer reacts to the wave motion instinctively to steer the vehicle to "catch-up" to the wave patterns. In the present invention, the "catch-up" actually causes a cessation of the wave patterns; that is, in the absence of a command, motion ceases.

Observations made of this type of display indicate that pattern motion can be detected out to about the limits of peripheral vision—±90° laterally. Employing a scheme wherein the waves were made up of a pattern of illuminated lamps indicated that the direction of motion of the pattern could be reliably detected only to ±30° laterally. However, reversing the type of light sequence was found to improve the direction significantly. Thus, in a preferred embodiment, all lamps in the pattern are normally "on" and wave motion is simulated by turning rows or patterns of lights off in the proper sequence. By creating "dark" waves, the direction of the wave motion was found to be reliably detectable up to about ±45° laterally and +45°, −60° vertically.

A further observation regarding this type of apparatus is that there is no limit on the lowest wave frequency as concerns perception, while a usable upper limit for the five-row matrix, such as illustrated, was found to be approximately five waves per second, above which a frequency-fusion frequency is reached beyond which no motion is perceivable. At about five waves per second, a flicker change (that is the rate of change) is not well perceived and thus frequencies above five waves per second do not contribute useful linear command information.

Further observations regarding an indicator of the type illustrated in FIGURE 1, and because of which certain implementations in the present invention are utilized, is that regarding the "flash-back" effect. The flash-back effect may be described as the phenomenon occurring when a wave has proceeded to the edge of the panel and reappears as the next step on the opposite edge of the panel. The human eye may perceive this as one big jump opposite that of the wave motion and thus interpret it as a conflicting command. Investigation has shown that the flash-back effect disappears if there is a pause before the next step starts. For purposes of the present invention a pause might be instituted by skipping every other wave. The optimal retrace-time interval depends upon the wave rate. At very fast rates at least one blank wave period may be needed. At very slow wave rates, no pause might be needed. A means is accordingly incorporated in the present invention to arrive at an optimal retrace time.

Figure 2:
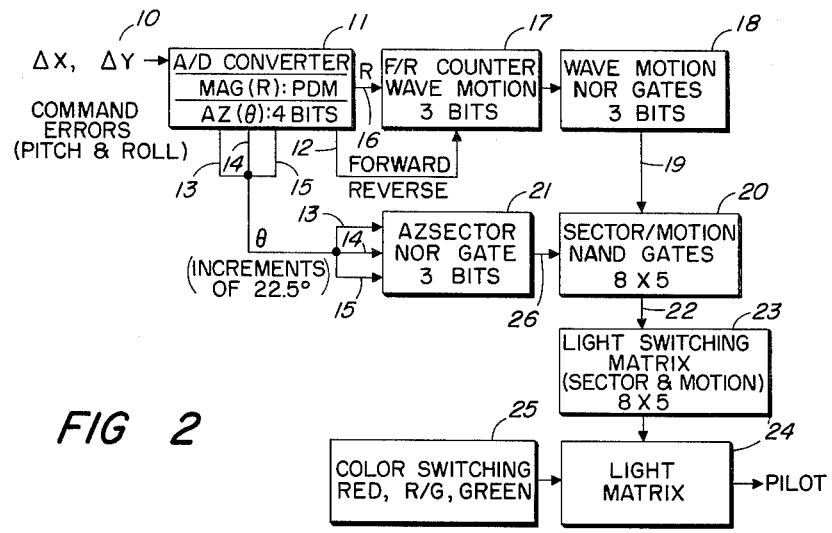
FIGURE 2 is a general functional diagram of the present invention.

FIGURE 2 illustrates a basic functional diagram of the present invention indicating the general manner in which the present invention converts input command signals (such as pitch and roll commands) to wave motions with a rate of movement proportional to the intensity of the input command, and with a direction of motion, corresponding to the nearest 22.5° azimuth sector, the sense or direction of the command.

FIGURE 2 illustrates input command error signals 10 which might be in the form of a ΔX signal indicating a lateral or roll error and a ΔY signal indicating a vertical or pitch error. For the purpose of the present invention, the development of these command error signals will not be considered in detail since formation of such signals is well developed in the autopilot art. It will suffice to state that the ΔX and ΔY are signals indicative of the discrepancies between instantaneous aircraft attitude and the change in attitude which is necessary to make good a given flight path. These command error signals are actually rectangular coordinate signals, the result of which is a command vector. It is to be understood that the error input may be completely ΔX, completely ΔY, or a combination of the two; the latter defining a composite command for changing aircraft flight path in both the horizontal and vertical planes. The ΔX and ΔY inputs are applied to an analogue-to-digital converter 11. The purpose of analogue-to-digital converter 11 is twofold. Converter 11 changes the magnitude of the resultant command vector defined by ΔX and ΔY to a sequence of pulses to provide a first output 16 comprised of a train of pulses, the pulse rate of which is the analogue of command magnitude. Converter 11 further develops a three bit output 13, 14, and 15 developed by resolving the X–Y command into four parallel information bits representing the 22.5° azimuth sector containing the azimuth angle defined by the rectangular input coordinates ΔX and ΔY. The fourth azimuth bit required is simply the sign of the ΔY command, up or down.

The train of output pulses 16 is applied to a forward-reverse counter 17 which converts the magnitude indicative pulse train 16 into a parallel form for use in controlling wave stepping of the indicator. As previously discussed, the wave motion is simulated by stepping or turning off adjacent rows or patterns of indicating lamps. As will be further discussed, counter 17 is a three-bit counter capable of counting to $2^3$. The present invention then utilizes five consecutive ones of the eight possible counts to produce wave motion. During the remaining three of the eight counts, all indicating lamps are on, producing no illusion of motion. The remaining three counts are thus utilized for the "re-trace" time. The maximum pulse rate developed by converter 11 is in the order of 40 pulses per second or five waves per second. The utilization of three of every eight counts for "re-trace" time minimizes the flash-back effect. The output from counter 17 is applied to a grouping of five "nor" gates 18, the outputs 19 of which are applied to a matrix of sector/motion "nand" gates 20. Gates 20 additionally receive azimuthal information 26 from a grouping of azimuth sector "nor" gates 21, the latter receiving the three azimuth information bits 13, 14 and 15 from analogue-to-digital converter 11. As will be further discussed, the remaining azimuthal information bit, 12, is utilized as a forward-reverse control for the counter 17 to control wave motion in response to azimuth angles and azimuth angle complements.

The outputs from the sector/motion gates 20 is a composite logic output information 22 which, as will be further discussed, is comprised of eight bundles or trunks of five wires each; one bundle for each 22.5° azimuth sector and one wave-step per wire. These bundles 22 are fed into a lamp switching matrix 23 which is composed of a matrix of 25 gate drivers each each associated with one of 25 indicating lamps in the indicating matrix 24. Matrix 23, combining azimuth sector and wave motion logic, effects the desired sequential energization of adjacent rows or patterns of indicating lamps.

In accordance with the present invention a further control of the light matrix may be introduced by means of a color switching control 25 wherein each indicating lamp in the matrix may actually be comprised of an adjacent grouping of colored lamps such that, in addition to the command presented by the light wave motions, the color of the lamps may be varied in accordance with a further command such as, for example, error in throttle setting to form an optimum throttle setting.

Details of the manner in which lines or patterns of lamps in the indicating matrix are caused to simulate waves moving across the face of the indicator in any one of 16 wave-front angles will further be discussed in detail. It might here be emphasized that the lamp lighting control incorporates a combination of azimuth and step-rate informations to cause, in the simplest command situations, a sequential energization control of all the lamps in each column across the face of the indicator or, alternatively, all the lamps in each row of the indicator up and down the face of the indicator. These simplest of command situations might be those developed in response to pure ΔX and pure ΔY input error signals respectively. Considering, however, that composite commands are to be visually portrayed, it is seen that a number of permutations affecting energization control of lamps in different rows and columns so as to form various diagonal lines or waves across the indicator face necessitates a more advanced logic switching, details of which will be further considered.

As above discussed, the present invention indicates command azimuth as a wave front traveling across the face of the indicator in a direction defined by one of 16 azimuthal sectors, each sector representing 22.5°. The actual command vector angle is therefore converted to an azimuthal sector control action and command angles are represented to the nearest 22.5°.

Azimuthal information is converted in analogue-to-digital converter 11 such as to portray each input command vector angle to the nearest 22.5° azimuth sector as defined by a four bit analogue representation. As previously discussed, the analogue to digital converter additionally computes the resultant R of the command vector and converts the magnitude R to a pulse train with repetition rate proportional to magnitude. The magnitude indicative pulse train is utilized to step the wave motion on the indicator while the azimuth information is utilized to develop parallel outputs, each stepped in accordance with the magnitude pulse train and each individually controlling predetermined rows or patterns of lamps on the indicator to simulate wave motion correlated with the command azimuth sector.

FIGURE 4 represents in further detail the functional operations performed in response to the input X–Y command signal to develop the azimuth determining bits and the magnitude of the pulse train. Before considering the functional operations of the circuitry of FIGURE 4, reference is made to the tabulation of FIGURE 3 which illustrates the trigonometric logic as utilized in the present invention to convert the command information to digital output information.

The command azimuth is to be represented by one of sixteen sectors. A command vector with azimuth between 0° and +22.5° is identified as sector 1 and is portrayed as 0°. Vector commands with azimuths between 22.5° and 45° are defined as sector 2 and will be portrayed as 22.5°, etc. The analogue to digital conversion scheme for angles in accordance with the present invention is then the conversion of the input command azimuth to a four bit parallel digital representation defining a 22.5° sector.

Figure 3:
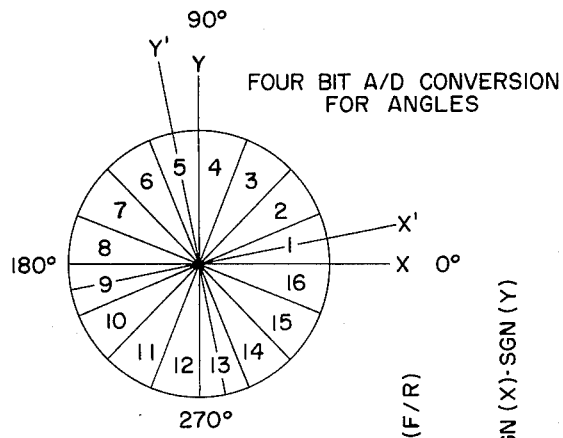
FIGURE 3 is a diagrammatic representation of a type of analogue to digital conversion for angles as utilized in the present invention.

With reference to the table of FIGURE 3, an orthogonal set of four bits is selected such that each of the sixteen azimuth sectors may be uniquely represented by one of the sixteen possible combinations. The term "Sgn," as appearing in the expressions for the four bits, is the abbreviation for "sign" and, as used herein, refers to the polarity or sense of the following quantities. X and Y refer to the input command rectangular coordinates. The logic is trigonometric; thus in sector 1, and throughout the first quadrant, any vector is composed of rectangular coordinates X and Y, the respective senses of which are positive. Remaining sectors are assigned X and Y senses in conformance with trigonometric convention. The four bits to be utilized are:

Sgn $Y$,
Sgn $X \cdot$ Sgn $Y$,
Sgn $(|X|-|Y|)$, and
Sgn $[>(|X|$ or $|Y|)-0.924R]$ The polarity of X itself is not used but is utilized in combination with the other values. The tabulation of polarities of these four bits is seen to be distinctly different for each of the 16 sectors. It may further be noted that complementary sectors, that is sectors 180° displaced, are identified identically with the exception of the polarity of Y. For the purpose of the present invention then, an input command azimuth may be represented, utilizing only sectors 1 through 8 with the complementary sectors 9 through 16 being represented by using the polarity of Sgn Y in an operational sense to cause a forward or reverse direction of the wave travel. For example, considering sectors 1 and 9, it is noted that Sgn Y is positive for sector 1 and negative for sector 9 while the remaining three bits for each sector are all positive. If then, means are employed to cause the indicating wave to move from left to right on the screen to indicate a command in sector 1, a command vector lying in sector 9 may be portrayed by a reversal of the wave travel under the control of Sgn Y. We shall then be concerned with the recognition of eight different bit combinations, each definitive of an azimuth sector and a complementary sector as portrayed by light patterns, the utilize Sgn Y to reverse the wave stepping procedure to portray complementary azimuths.

Reference may now be made to the diagram of FIGURE 4 wherein means are indicated to develop the azimuth bits and, for reasons to be further discussed, the azimuth bit complements. It is to be understood that the bits and bit complements represent binary type of information and while they are indicated in the tabulation of FIGURE 3 as polarities "+" and "−," in actual practice a plus (+) might be represented by 0 volt and indicate a binary "0," while a minus (−) polarity might be represented by a −6 volts and be represented as a binary "one."

The circuitry of FIGURE 4 receives input command information in the form of X and Y rectangular coordinates identified as 10a and 10b respectively. The respective polarity of inputs 10a and 10b are analyzed and appropriately combined to develop outputs in the form of the four azimuth identifying bits represented and identified in FIGURE 3. To remove ambiguity at the quadrant extremes, an angular transformation of 11.25° is performed with operational amplifiers 30, 31, and 32 so as to make the center of the azimuth sector the decision point rather than their edges. The transformed quantities are indicated as X' and Y' as developed on lines 34 and 44 respectively and are the quantities indicated graphically in FIGURE 3. The quantity −X' is applied through amplifier 33 to develop the quantity +Sgn ($x'$) on line 38. Amplifier 33 is of a type providing an output in one of two conditions, depending upon whether the input voltage is greater than zero or less than zero. The quantity −Y', as developed on line 44, is applied through a similar amplifier 41 to develop the quantity +Sgn (Y') on output line 43. The quantity Sgn Y' is applied through inverter 42 to develop the quantity −Sgn Y'. The outputs from amplifier 41 and inverter 42 correspond to the Sgn Y' azimuth bit and its complement which are to be utilized for forward and reverse control of the wave motion counter 17.

The output from amplifier 33 corresponding to Sgn (X') and the output on line 43 corresponding to Sgn (Y') are applied to an exclusive "or" circuit 39 which determines the product Sgn $X' \cdot$ Sgn $Y'$, the second azimuth bit indicated in FIGURE 3.

Absolute values of X' and Y' are developed in operational amplifiers 35 and 45 respectively. Amplifier 35 determines the absolute value of X' and supplies this value through an emitter follower 36 (to supply power while providing low driving impedance). The absolute value of Y', as developed in amplifier 45, is applied to an emitter follower 46. Operational amplifier 59 inverts the absolute value of Y' to provide −Y'. The absolute values of X' and Y' are compared in amplifier 57 to develop the third azimuth bit, and applied through inverter 58 to develop the corresponding bit complement.

Diode function generators 54 and 50 also receive the outputs from emitter follower 36 and 46 which correspond to the absolute value of X' and Y', respectively. Diode function generators 50 and 54 are arranged to square the absolute valves of X' and Y'. The output from function generator 54 is applied to an emitter follower 55 to supply a signal 56 to a summing amplifier 53. The output from function generator 50 is applied to an emitter follower 51 to supply input 52 to summing amplifier 53. The output from summing amplifier 53 is the sum of the squares of X' and Y' and is applied through emitter follower 60 to a diode function generator 61 which produces the square root of the input thereto. Thus, the output from function generator 51 corresponds to R, the resultant of the command vector.

The command resultant R is, in addition to being applied to the pulse rate converter 62, applied back to the operational amplifier 49 which additionally receives inputs corresponding to X' and Y', and develops the fourth azimuth bit. Inverter 48 develops the corresponding bit complement. The fourth azimuth bit is determined by taking the larger magnitude (X' or Y') and comparing it with 0.924R; the comparison value being the cosine of 22.5°.

The analogue-to-digital converter portion of the invention, as illustrated in FIGURE 4, is thus seen to receive the input command X and Y signals and, through the use of operational amplifiers and functional generators, to determine the polarities of the various quantities and arrive at output signals corresponding to the resultant R of the command vector, and four azimuth sector identification bits as illustrated in FIGURE 3.

The remaining circuitry of FIGURE 4 receives the magnitude R as an input 16 to a voltage-to-pulse rate converter 17. Pulse rate converters are known in the art and, for the purpose of the present invention, may be any such circuitry arranged to convert the magnitude of the input signal to a train of pulses with repetition rate directly proportional to the input signal magnitude. This train of pulses is utilized to produce the wave step motion within the indicator. For this purpose a three bit counter 17 receives the train of pulses and converts the pulse train into parallel output information for use in stepping the indicator lamps.

As indicated in FIGURE 10, counter 17 is comprised of three conventional flip-flop circuits with logic coupling between successive stages through which the counter may be made to reverse its direction of operation under the control of the previously discussed information bits Sgn Y. FIGURE 4 illustrates Sgn Y as input 12 to the counter 17. In actual embodiment, the forward-reverse action is accomplished by using Sgn Y and its complement —Sgn Y connected as shown in FIGURE 10 (each being referenced to common ground). Counter 17 counts in binary fashion a continuously repetitive sequence from 0 through 7; that is, the counter counts to 8 and then repeats. The count from binary counter 17 is converted to parallel information by utilizing the bit and bit complement (Q and $\overline{Q}$) from each of the flip-flop stages, which, for purposes of illustration, have been illustrated as $2-\overline{2}$, $4-\overline{4}$, and $8-\overline{8}$, respectively. Forward-reverse action is effected by gating either the Q or $\overline{Q}$ stage outputs as interstage coupling within the counter chain.

Reference is made to FIGURE 5 wherein the counter is functionally represented as three successive stages each identified in terms of its binary weight, such that six outputs from the counter are developed, which collectively, in conventional fashion represent the binary number corresponding to the count. The purpose of the bits-to-waves converter 18 is to develop five parallel outputs in the form of a sequence of information bits corresponding to five of the eight counts developed within counter 17. For this purpose, the embodiment of the present invention employs five "nor" gates. As previously discussed, only five of the counts are to be utilized for wave stepping action and the time duration of the remaining three counts of each count sequence is utilized for flash-back time in the indicator. A logic which may be employed, as concerns the bits-to-wave converter 18, is considered in the tabulation of Table 1. Table 1 illustrates the number of input pulses to the counter 17 in conjunction with the conventional binary number associated therewith; which, for example, in conventional counters might be the "$\overline{Q}$" outputs from each of the three stages in the counter. Thus, with use of the "nor" gates, this line information may be used to present parallel information and a three stage binary counter is thus capable of developing eight parallel outputs. With reference again to Table 1, the binary number associated with the counts is represented first as a logic in terms of permutations of A, B, C and $\overline{A}$, $\overline{B}$, and $\overline{C}$. That is to say, a logic gate would, for count "0" receive $\overline{A} \cdot \overline{B} \cdot \overline{C}$ and provide an output in response thereto if the logic gate were an "and" gate.

In the illustrated embodiment, since negative logic is to be employed (wherein "0" corresponds to 0 volt and "1" corresponds to —6 volts) "nor" gates are utilized. Table 1 illustrates the logic transformation by which permutations of A, B, and C and $\overline{A}$, $\overline{B}$, and $\overline{C}$ as required for "nor" gate operation are developed. FIGURE 5 illustrates the corresponding interconnections between the outputs from counter 17 and the five such "nor" gates utilized to effect a five stage wave motion. In operation, "nor" gate 18a, upon a count of 1, provides an output 19a. Outputs 19b–19e follow in time sequence from successive ones of "nor" gates 18b–18e at a rate defined by repetition rate of the pulse train applied to counter 17. The outputs from "nor" gates 18 are applied to a further gate matrix within which the wave stepping action is combined with azimuth identifying information for ultimate light matrix control. This further gate matrix has previously been identified as sector/motion "nand" gates 20 and is arranged as five columns of eight gates each. Each column of the gates within matrix 20 receives an output 19a–19e from one of the "nor" gates 18a–18e as a first input thereto. As these inputs 19a–19e are sequential, the columns of gates are identified by steps 1 through 5. Each of the "nand" gates in the matrix 20 produces an output in the presence of a second input thereto being simultaneously applied. The second inputs are in the form of azimuth information as developed within the bits-to-sector converter 21.

TABLE 1

| Count No. | A B C Binary | "AND" Logic | Input "NOR" Logic | Step Usage | To "NOR" Gate |
|---|---|---|---|---|---|
| 0 | 000 | $\overline{A} \cdot \overline{B} \cdot \overline{C}$ | $A+B+C$ | Off | ------ |
| 1 | 001 | $\overline{A} \cdot \overline{B} \cdot C$ | $A+B+\overline{C}$ | 1 | 18a |
| 2 | 010 | $\overline{A} \cdot B \cdot \overline{C}$ | $A+\overline{B}+C$ | 2 | 18b |
| 3 | 011 | $\overline{A} \cdot B \cdot C$ | $A+\overline{B}+\overline{C}$ | 3 | 18c |
| 4 | 100 | $A \cdot \overline{B} \cdot \overline{C}$ | $\overline{A}+B+C$ | 4 | 18d |
| 5 | 101 | $A \cdot \overline{B} \cdot C$ | $\overline{A}+B+\overline{C}$ | 5 | 18e |
| 6 | 110 | $A \cdot B \cdot \overline{C}$ | $\overline{A}+\overline{B}+C$ | Off | ------ |
| 7 | 111 | $A \cdot B \cdot C$ | $\overline{A}+\overline{B}+\overline{C}$ | Off | ------ |

TABLE 2

| Azimuth Bits | | | Azimuth Sector | | Azimuth Reciprocal | | "AND" Logic | Input "NOR" Logic | To "NOR" Gate |
|---|---|---|---|---|---|---|---|---|---|
| 13 | 14 | 15 | No. | θ, degs. | No. | θ, degs. | | | |
| 0 | 0 | 0 | 1 | 0 | 9 | 180 | $\overline{A} \cdot \overline{B} \cdot \overline{C}$ | $A+B+C$ | 21a |
| 0 | 0 | 1 | 2 | 22.5 | 10 | —157.5 | $\overline{A} \cdot \overline{B} \cdot C$ | $A+B+\overline{C}$ | 21b |
| 0 | 1 | 1 | 3 | 45 | 11 | —135 | $\overline{A} \cdot B \cdot C$ | $A+\overline{B}+\overline{C}$ | 21c |
| 0 | 1 | 0 | 4 | 67.5 | 12 | —112.5 | $\overline{A} \cdot B \cdot \overline{C}$ | $A+\overline{B}+C$ | 21d |
| 1 | 1 | 0 | 5 | 90 | 13 | —90 | $A \cdot B \cdot \overline{C}$ | $\overline{A}+\overline{B}+C$ | 21e |
| 1 | 1 | 1 | 6 | 112.5 | 14 | —67.5 | $A \cdot B \cdot C$ | $\overline{A}+\overline{B}+\overline{C}$ | 21f |
| 1 | 0 | 1 | 7 | 135 | 15 | —45 | $A \cdot \overline{B} \cdot C$ | $\overline{A}+B+\overline{C}$ | 21g |
| 1 | 0 | 0 | 8 | 157.5 | 16 | —22.5 | $A \, \overline{B} \, \overline{C}$ | $\overline{A}+B+C$ | 21h |

Each of the second inputs 26a–26h to the "nand" gates in the matrix 20 is seen to be applied simultaneously to each of the gates in a given row. Unlike the wave stepping inputs 19a–19e, the azimuth inputs 26a–26h are not in repetitive sequence but are continuous for one row of gates 20 when the command input information defines a given azimuth sector θ. Thus, assuming the input command defines a vector which lies in sector 1, the "nand" gates in row 1 produce outputs coinciding with each of the sequential wave stepping inputs 19a–19e. The output 22a from row 1 of matrix 20 is therefore in the form of a bundle of five wires each wire of which is sequentially provided with an output (in the actual embodiment, each of the five wires, 22a, is sequentially brought from a −6 volts to 0 volt, or ground). The matrix 20 is thus seen to develop eight groups of parallel output information, each of the eight groups corresponding to a given azimuth sector and each including a five-step output sequence. As will be further defined, these bundles of five-step outputs are then tied into a further light driving matrix so as to turn off azimuth defining rows or patterns of lamps corresponding to the command azimuth in a five-step sequence and at a rate proportional to the command magnitude.

The azimuth defining control action of the matrix 20 is developed from the plurality of "nor" gates 21, each of which receives a predetermined permutation of azimuth bits 13, 14 and 15 and the respective complements thereof. Azimuth defining bits 13, 14 and 15 are those corresponding to the quantities shown in the tabulation of FIGURE 3 and as developed in the operational circuitry of FIGURE 4. The actual conversion of this information to azimuth control in the indicator is accomplished through the use of three of the azimuth bits and their complements, the fourth (sgn Y′) being utilized to reverse the action of the counter 17 and thus reverse the sequence of the outputs from "nor" gates 18 into the combining matrix 20.

Table 2 illustrates a logic consideration whereby the azimuth defining bits 13, 14 and 15 and their complements may be utilized to develop eight parallel outputs from gates 21, each of which corresponds to an azimuth sector and its complement. With reference to Table 2, the first eight sectors are tabulated in conjunction with the three bits 13, 14 and 15 as represented in conventional binary form wherein 0 corresponds to "+" or $\bar{Q}$ and 1 corresponds to "−" or Q. Associated with the binary representation of the three azimuth bits is a tabulation of the corresponding conventional binary count represented thereby. It is noted that each of the eight azimuth sectors is represented by three bits corresponding to the binary form of numbers 0 through 7. This logic may be employed in a fashion similar to that used in the development of the five parallel wave step outputs taken from the binary counter 17. Again identifying the bits 13, 14 and 15 and their complements as corresponding permutations of $\bar{A}$, $\bar{B}$, $\bar{C}$ and A, B, C, Table 2 illustrates the conversion from the conventional "and" gate logic to "nor" gate logic from which the interconnections between the azimuth bits 13, 14, and 15 and their respective bit complements and the "nor" gates 21 may effect the eight parallel outputs 26a–26h each corresponding to one of the azimuth sectors 1 through 8. Table 2 further illustrates the corresponding azimuth sector associated with each of the gates and the reciprocal or complement of the azimuth sector; the latter being affected by a reversal of the wave motion.

The above discussed switching logic employs a straight binary azimuth code. It is to be realized that other codes may be employed with the necessary conversions between the trigonometrically defined bits 13, 14, 15 and the "nor" gate 21 being effected by appropriate re-wiring of the input permutations to gates 21. For example, a "Gray" code or other reflected type of code might be used which would reduce quantizing error or uncertainty. These types of codes are characterized by only one bit change per unit increase.

Figure 6:
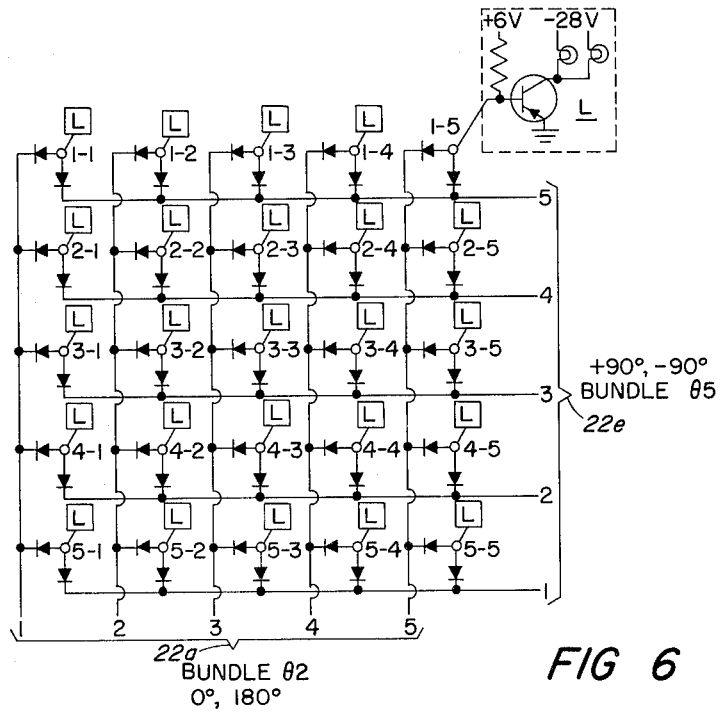

The eight bundles 22a–22h of output wires from the sector/motion "nand" gates 20 contain the switching logic for the light matrix. These outputs represent paralleled outputs of five wires each, which, as indicated in FIGURE 4, are applied to a matrix of 25 "nand" lamp drivers 23. As previously discussed, only one of the bundles of control wires 22a–22h (that correspond to the particular azimuth sector defined by the input command vector) is provided with the sequential five-step wave motion information. Each of the wires 1–5 associated with any of the bundles 22a–22h may then be wired through a "nand" logic device to a plurality of lamps in the matrix which defines a grouping or row corresponding to the command azimuth. Reference is made to FIGURE 11 which indicates the interconnections between the lamp driving outputs 22a–22h and the lamp matrix wiring of FIGURES 6 through 9. For purposes of explanation and clarity, the lamp matrix comprised of five rows of five lamps each, is repetitively illustrated in FIGURES 6–9. With reference to FIGURE 6, the matrix is represented by 25 terminals common to each of FIGURES 6, 7, 8 and 9. Those terminals in row 1 are identified as 1—1, 1–2; etc; those in row are identified by 2–1, 2—2, 2–3, etc.

FIGURE 6 illustrates the five wave stepping wires 1–5 associated with bundle 22e as being applied through diode members to each of the common terminals in each row of the matrix. Thus, wire 5 of bundle 22e (corresponding to $\phi \pm = 90°$) is applied through diode members to each of the terminals 1—1 through 1–5. Wires 4, 3, 2 and 1 are wired to each of the common terminals in the second, third, fourth and fifth matrix rows, respectively. Each of the common terminals has associated therewith a lamp driver (L) comprised of a transistor the base of which is tied to the terminal, the emitter of which is grounded, and the collector of which is connected through an indicating lamp or lamps to a negative D.C. voltage source. The base of the transistor is connected to a source of +6 volts. FIGURE 6 illustrates that each of the common terminals in the matrix is tied to a functional block "L," it being realized that each of these functional blocks represents the lamp driving arrangement shown connected to terminal 1–5. As previously discussed, should the input command vector correspond to +90°, the input bundle 22e delivers an input to the matrix comprised of the sequential grounding of the associated wires 1 through 5. The transistors associated with each of the lamp drivers "L" are normally conducting and thus the lamps associated therewith are normally illuminated. Now, considering that wire 1 of bundle 22e is grounded, the driver transistors associated with all lamp drivers connected to wire 1 are cut off and the lamps associated therewith are extinguished. Therefore, in the presence of a command, the vector of which lies in section 5 (+90°) the lamps in the matrix are sequentially extinguished in permutations defined by those which are commonly connected to any one of the wires 1 through 5 of bundle 22e. In operation, the rows of lamps in the matrix are sequentially extinguished from the bottom row towards the top row in a repetitive sequence.

FIGURE 6 further illustrates the wiring associated with the indicating matrix to present θ=0°, 180° azimuth commands. This is affected by the interconnection of the five wave stepping control wires associated with bundle 22a being connected in common through gating diodes to all of the common terminals associated with one of the columns in the matrix. Through this interconnection, an input command vector representing 0° is portrayed by sequentially extinguishing all lamps in the matrix columns in a repetitive sequence from left to right. The reciprocal or complementary azimuth sectors are portrayed automatically through the same wiring interconnections by a reversal of the wave stepping sequence as concerns the five wires in either of the control bundles. Thus, a command vector corresponding to −90° is portrayed by sequentially extinguishing each of the lamps in the matrix rows from top to bottom. Similarly, a command vector corresponding to 180° is portrayed by sequentially extinguishing each of the lamps in the matrix columns from right to left.

Figure 7:
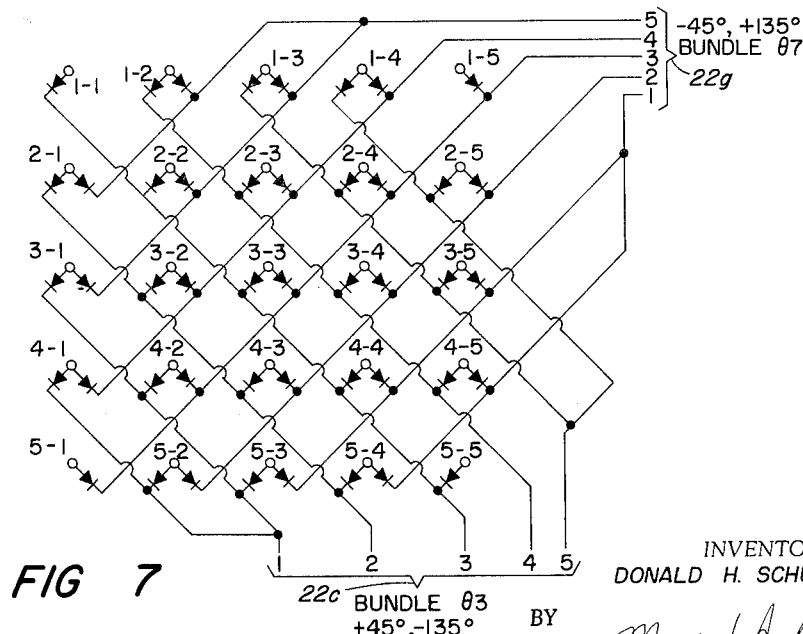
Figure 8:
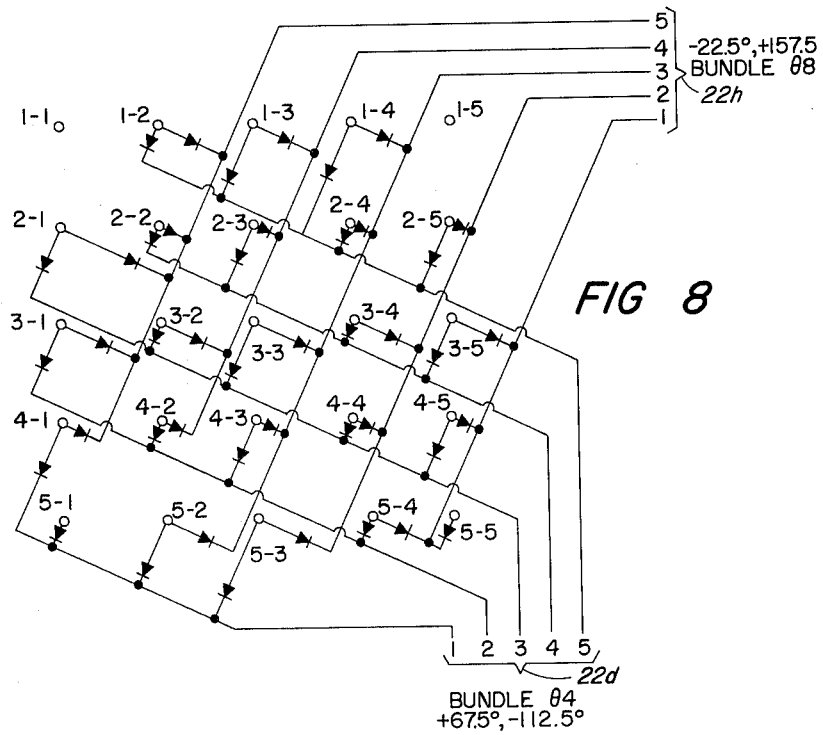
Figure 9:
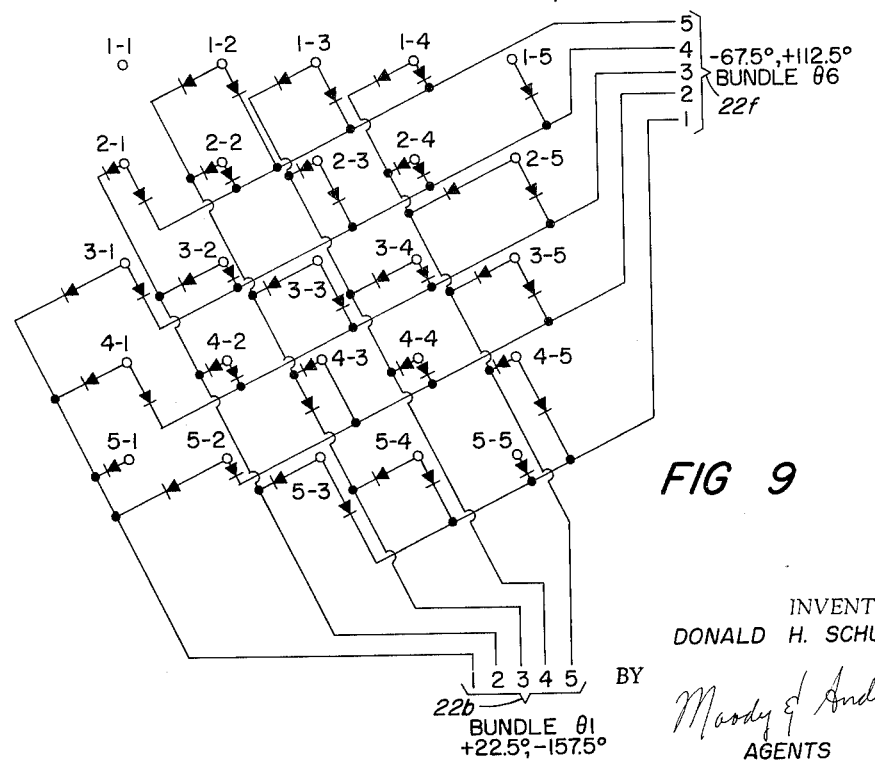

Wave motions portraying input command vectors lying in the remaining azimuth sectors are affected by the further interconnections between the azimuth bundles and the common terminals of the lamp matrix as illustrated in FIGURES 7, 8 and 9.

It must here be emphasized that the common terminals associated with the lamp drivers "L," as discussed with reference to FIGURE 6, are common to those portrayed in FIGURES 7, 8 and 9. The complete wiring between the azimuth bundles 22a–22h and the lamp matrix is portrayed in four figures each showing the interconnection of two azimuth bundles, for purposes of clarity. Thus, the common terminals 1—1 are common tie points as concerns FIGURES 6, 7, 8 and 9 and a lamp driver "L" is commonly associated with each of the common terminals. Each of the common terminals is in actuality a common tie point for the base of one of the lamp switching transistors, and for a plurality of gating diodes up to a maximum of 8 per transistor base. The arrangement is shown schematically in FIGURE 12 for the lamp associated with matrix terminal 3—3 wherein wire (step) 3 of each of the azimuth bundles 22e–22h is shown connected through a gating diode to terminal 3—3. FIGURE 12 further illustrates how each lamp may actually be a plurality of different colored lamps, each of which is returned to the −28-volt source through an isolating diode and color switching control 25.

FIGURE 7 illustrates the interconnections of azimuth bundles 22c and 22g to the matrix so as to portray wave motion diagonally across the indicator face corresponding to command vectors of ±45° and ±135°. The wave motion steps are here effected by the extinguishing of different numbers of lamps per step. Thus, considering a command azimuth of +135°, the first wave stepping action affected by wire 1 of bundle 22g is seen to extinguish a pattern of five lamps in the lower right-hand corner of the matrix as a first wave step; while wire 2 extinguishes four lamps defining a row; wire 3 extinguishes five lamps arranged diagonally across the matrix; wire 4 extinguishes four lamps in a row and wire 5 extinguishes five lamps in a pattern at the upper left-hand corner of the matrix. It is therefore emphasized that the switching logic permits an unlimited variation in the patterns or lines of lamps which one might wish to extinguish to portray the wave motion.

FIGURES 8 and 9 represent the wiring interconnections to the matrix to produce wave motion patterns corresponding to azimuth commands in the remaining azimuth sectors, in which cases it is shown that the desired azimuth sector is portrayed by extinguishing patterns of lamps most appropriately simulating the azimuth.

The present invention is thus seen to provide a novel indicating means by which command vectors may be portrayed in the form of wave motion patterns created by a matrix of lamps. For each of 16 azimuth sectors a five-step wave motion is realized in the form of "dark" waves caused by extinguishing appropriate rows or patterns of lamps in a matrix configuration. In a constructed embodiment, the dynamic command presented by the indicator of the present invention was found to be effective as an aircraft guidance indicator to a degree compatible with known peripherally viewed dynamic command indicators.

Experiments indicate that a maximum wave-stepping action of five steps per second may be utilized and clearly interpreted by the observer. A minimum wave step action at a rate of one step per 1.5 seconds was found to be interpretable. Below this minimum wave-stepping rate, some confusion might result from the flash-back pause previously defined as three of the eight steps initiated by the counter 17. Means may therefore be additionally employed to stop and reset the wave-stepping counter 17 should the magnitude of the command vector fall below a predetermined threshold. This provision is indicated functionally in FIGURE 4 as a threshold and reset arrangement 63–64–65 monitoring the magnitude of the command vector and effecting a cessation of the wave counting in counter 66 and reset action and thus turn on all matrix lamps to indicate zero command. Command magnitude is sensed in threshold device 63 and utilized to block the application of the pulse train from generator 62 to counter 66 by means of emitter-follower 65, the latter functioning as an "and" gate. The threshold sensor 63–64 might then develop a ground output when the command magnitude falls below a predetermined minimum. This ground output is carried to a reset line common to each of the stages in counter 66 (see FIGURE 12) to simultaneously reset the counter. This arrangement was found to enhance the presentation and eliminate the confusion which might be presented to the observer should an unduly long reset period, corresponding to three wave-step intervals, be effected. Without a common threshold, the observer, seeing no wave-stepping action for a considerable period, might not know whether the command had been reduced to zero or whether he was merely "waiting" for the flash-back pause to end and wave-stepping action to repeat its five step sequence.

Although the present invention has been described with respect to a particular embodiment thereof, it is not to be so limited as modifications might be made therein which fall within the scope of the invention as defined by the appended claims. The invention, for example, contemplates the employment of more sophisticated indicating martices employing more rows and columns in conjunction with the indication of a greater number of correspondingly smaller azimuth sectors. The five-step control of a 25 lamp matrix, as utilized in the described embodiment, was found to be sufficient for command interpretation consistent with the degree of error threshold with which an observer may interpret the wave motion peripherally as changing in azimuth. The portrayed embodiment, therefore, is considered an optimized embodiment as concerns command interpretation and hardware requirements.

I claim:

1. A wave motion indicator comprising a matrix pattern of a predetermined number of rows and columns of indicating lamp means, a source of input command signals X and Y respectively indicative of the rectangular coordinates defining a command vector, analogue to digital conversion means receiving said X and Y input signals and developing therefrom a first series of line-separated signal control pulses defined by first and second voltage levels and having a repetitive rate proportional to the magnitude of said command vector, said conversion means further developing from said X and Y input signals, a second series of line-separated control pulses each in response to a predetermined one of a plurality of azimuth sectors within which the command vector defined by the X and Y input sectors lie, coincidence gating means comprising predetermined number of rows and columns of coincidence gates, means connecting each of said first series of control pulses as first inputs to each of those coincidence gates defining a matrix column, means applying each of said second series of control pulses as second inputs to each of those coincidence gates defining a matrix row, means connecting the outputs from each of said coincidence gates to predetermined patterns of said indicating lamp means to control the energization thereof and thereby simulate a stepping wave across the plane of the indicating lamp matrix in a direction corresponding to the azimuth sector defined by said command vector and is at a stepping rate proportional to the magnitude of said command vector.

2. A wave motion indicator comprising a matrix pattern of indicating lamp means arranged in $n$ rows and $n$ columns and including means to control the energization of predetermined ones of said indicating lamp means in a respective step-sequence to create an illusion of motion across the plane defined by said indicating lamp means in a direction substantially corresponding to the azimuth defined by the resultant of first and second rectangular coordinate input command signals; said energization controlling means comprising means responsive to said input signals to develop a pulse train proportional to the vector magnitude defined thereby, pulse counting means receiving said pulse train and converting said pulse train to a plurality $m$ of digital output step signal lines, further means responsive to said input signals to develop from trigonometric logic a plurality of information bits each definitive of a particular one of a predetermined plurality of azimuth sectors, logic gating means receiving said plurality of azimuth information bits and developing therefrom a plurality of azimuthal signal lines, a plurality of further gating means arranged in $m$ rows and $n$ columns, each of said further gating means in a particular row receiving one of said step signal lines as a first input thereto, each of said further gating means in a column receiving one of said azimuth signal lines as a second input thereto, and the outputs from each of the gates in said rows connected individually to a plurality of said indicating lamp means, each plurality of indicating lamp means being arranged in a pattern extending across the plane of the indicating lamp matrix substantially perpendicular to one of said predetermined azimuth sectors, whereby the energization of those predetermined plurality of indicating lamp means connected to each of said further gating means in that row receiving an output from said azimuth gating means is controlled in a repetitive step sequence.

3. Indicating means as defined in claim 2 wherein said pulse train developing means includes means to develop a pulse repetition rate proportional to the magnitude of said command vector.

4. Indicating means as defined in claim 3 wherein said pulse counting means comprises a plurality of binary counter stages the normal count capacity of which is in excess of the plurality of $n$ output lines therefrom, said plurality of $n$ output lines being those upon which sequential ones of said outputs are developed, whereby the wave stepping energization control of said indicating lamp means is effected sequentially by $n$ consecutive ones of said pulses and is interrupted for the remaining ones of said count capacity.

5. Indicating means as defined in claim 4 wherein said pulse counting means includes gated coupling means between each of the successive stages thereof, said gated coupling means being responsive to a control signal to affect coupling of either the normal or complementary outputs from each stage to the successive one of said stages to effect respectively forward and reverse counting operation.

6. Indicating means as defined in claim 5 wherein said gated coupling means control signal is comprised of a first one of said azimuth information bits the binary state of which is reversed for all azimuth sectors within which the input signal coordinate Y is negative in accordance with trigonometric convention.

7. Indicating means as defined in claim 6 wherein predetermined permutations of the normal and complementary outputs from each of said binary counter stages are applied as input to $n$ logic gates from which are developed said paralleled signal outputs corresponding to $n$ consecutive counts of said binary counter.

8. Indicating means as defined in claim 7 wherein each of said azimuth information bits is resolved into a corresponding bit complement and predetermined ones of each of the remaining ones of said azimuthal information bits are applied as inputs to logic gates from which outputs are individually developed in response to each of said plurality of azimuth sectors lying between 0° and 180°, each of said logic gate outputs being applied as said second inputs to all those further gating means in a given matrix row.

9. Indicating means as defined in claim 8 wherein each of the indicating lamp means has associated therewith a lamp driving means in the form of a "nand" gate, the outputs from said further gating means corresponding to a give azimuth-sector as defined by its matrix row and column orientation being multiply connected to the inputs of each of said lamp driving means.

10. Indicating means as defined in claim 9 wherein each of said lamp driving means comprises a common terminal to which said azimuth-step inputs are connected each through an associated diode member, a normally conducting transistor the base and emitter elements of which are referenced to voltages respectively definitive of voltage levels defining the binary logic employed, the collector element of said transistor connected through indicating lamp means to a reference voltage source, said transistor being rendered nonconductive in response to an input signal to the base element thereof as applied from said further gating means whereby the indicator lamp means associated therewith is extinguished.

11. An indicating means as defined in claim 10 wherein said azimuth information bits are respectively defined as Sgn $(Y)$, Sgn $(Y) \cdot$ Sgn $(X)$, $$\text{Sgn } (|X|-|Y|)$$
$$\text{and Sgn}[>(|X| \text{ or } |Y|)-0.924R]$$

where Sgn refers to the algebraic polarity of the associated expressions, X and Y are the input rectangular coordinate command signals, R is the magnitude of the vector resultant defined by X and Y, $(|X|-|Y|)$ is the difference between the absolute values of X and Y, and $>(|X| \text{ or } |Y|)$ refers to the absolute value of that value of X or Y having the greater magnitude.

12. Indicating means as defined in claim 11 further including means to stop and reset said binary counter in response to the resultant R of the input command vector being less than a predetermined threshold magnitude.

13. Indicating means as defined in claim 12 wherein the input command signal X and Y are applied to the first and second operational amplifiers adapted to produce respective outputs equal to transformed values of the coordinates X and Y, said transformed values of X and Y being those associated with a command vector defined by X and Y rotated angularly an amount equal to one-half of one azimuth sector, and including further means developing said azimuth sector information bits in response to the magitude and polarity of said transformed X and Y coordinates.

14. Indicating means as defined in claim 10 wherein each of such indicating lamp means comprises a plurality of indicating lamps each of a different color and wherein each of said plurality of indicating lamps is connected between the collector element of said transistor and said reference voltage source through a color switching means by means of which selected ones and permutations of ones of said lamps are rendered energizable by said lamp driving means.

No references cited.

NEIL C. READ, *Primary Examiner.*

A. J. KASPER, *Assistant Examiner.*